July 21, 1970 P. S. MICHAEL 3,521,006

MULTICHANNEL COMBINATION ERASE AND RECORD-REPRODUCE MAGNETIC TRANSDUCER

Filed May 23, 1968 2 Sheets-Sheet 1

INVENTOR.

PAUL S. MICHAEL

BY

Merchant & Gould

ATTORNEYS

INVENTOR.
PAUL S. MICHAEL
BY
Merchant & Gould
ATTORNEYS 3,521,006
MULTICHANNEL COMBINATION ERASE AND RECORD-REPRODUCE MAGNETIC TRANSDUCER
Paul S. Michael, Minneapolis, Minn., assignor to The Nortronics Company, Inc., Minneapolis, Minn., a corporation of Minnesota
Filed May 23, 1968, Ser. No. 731,395
Int. Cl. G11b *5/26, 5/28*
U.S. Cl. 179—100.2 9 Claims

ABSTRACT OF THE DISCLOSURE

A dual track magnetic transducer for alternatively erasing and recording or playing back signals on a multitrack magnetic tape. A first group of generally U-shaped core pieces are mounted in a first core holder and a second group of generally U-shaped core pieces are mounted in a second core holder. The two core holders are mounted in a housing with the core pieces arranged in oppositely disposed pairs so that the core tips face each other and extend into openings in the tape engaging face of the housing. A generally flat center leg core holder is mounted between the first and second core holders and carries a group of center leg core pieces, one of which is positioned between each oppositely disposed pair of U-shaped core pieces. An erase coil is mounted on a side leg portion of each core piece in the first group and a recording/playback coil is mounted on a base leg portion of each core piece in the second group. Erase and recording gaps are provided between the core tips of the U-shaped core pieces and the top portion of the center leg core piece.

BACKGROUND OF THE INVENTION

Field of the invention

This invention relates generally to a combination magnetic head structure designed to record, erase and play back signals on a magnetic tape. The invention has particular utility for use with the new eight track stereo systems for homes and automobiles.

Description of the prior art

Eight track magnetic stereo tapes have recently been made available to the public for use in home or automobile stereo tape systems. An eight track system provides, on a single side of a magnetic tape, four pairs of tracks or channels. Each of the four pairs provides the same recording information as a standard dual track stereo tape. The system is designated so that either the tape head or the tape itself is moveable in a direction perpendicular to the path of the tape so that the tape head can be selectively aligned with the desired pair of channels. The tape head itself is a dual track stereo head.

On a standard two track stereo tape, the guard band between channels is approximately .070 inch wide. With such a wide guard band, it is not too difficult to design a stereo head that will either erase and record or play back. On the eight track tape, however, the guard band between channels is reduced to approximately .011 inch. During playback, care must be taken that signals from adjoining tracks are not picked up by the tape head. During erase and recording, the signals emanating from the tape head must not affect previously recorded adjacent tracks. In essence, the signals to and from the tape head must be narrowly confined since both the tracks on the tape and the guard bands between the tracks are very narrow.

The alignment of the tape head with respect to the track in eight track stereo systems is also very critical because of the narrow track width and spacing. During installation, the R/P gaps must be aligned for azimuth by rotating the head until the R/P gaps are perpendicular to the tape edge. In combination heads where the erase and R/P gaps are locked together in one assembly, the rotation for azimuthing causes the erase gap to move up or down with respect to the R/P gap. The farther that the erase and R/P gaps are spaced apart, the more difficult it is to achieve proper vertical alignment since a slight rotation of the head causes relatively greater vertical movements of the R/P and erase gaps in opposite directions. Further, when the gaps are relatively far apart, the curve of the tape head face prevents the pressure pads from maintaining good tape contact with both gaps.

Because of these and other technical difficulties involved, eight track stereo systems for the home and automobile have previously been available for only playback, with the majority of tapes being pre-recorded for sale to the public.

SUMMARY OF THE INVENTION

The present invention provides a stereo head to record and erase, or play back, signals on multi-track magnetic tape. Each magnetic core unit of the dual head is of the three-leg type, with the record/play and erase sections sharing a common center leg. By using a common center leg, the erase and record gaps are spaced only .050 inch apart, as opposed to .250 inch apart in many conventional designs. One degree of azimuth rotation of the present head moves the erase gap vertically less than .001 inch, compared with .004 inch in such conventional heads. Therefore, with the present head, it is much less difficult to achieve correct alignment than with prior heads. The present head also provides better tape-to-gap contact because the pressure pad easily covers both gaps. In fact, the head of the present invention can be used without pressure pads since the gaps are so close together and the radius of curvature of the tape head face is so small.

In the preferred embodiment shown in the drawings, two of the three-leg magnetic core units are used to provide two channel stereo. The distance between the units at the tape head face is quite small to correspond to the track spacing on the tape. To provide more room for erase and R/P coils, the two units are mounted in divergent planes with their base portions being further apart than their top portions. Also because of this close spacing, a highly permeable metal shield is mounted between the two magnetic core units to prevent cross talk between channels.

The presence of the shield, while reducing cross talk between channels, actually increases coupling between the erase and R/P coils of each unit, thus decreasing the signal to noise ratio of the unit. To reduce this coupling between coils on the same magnetic core unit, the two coils are mounted on mutually perpendicular axes. Lines of flux generated by one coil then do not directly intersect the other coil so as to increase its noise level. The erase coil is mounted on a side leg of the core unit while the R/P coil is mounted on a base leg. By placing the erase coil on the side or vertical leg closer to the erase gap, the flux field is intensified at the erase gap. At the same time, leakage flux from the erase coil travels through the two outer legs of the unit to provide record bias for the recording gap.

The tips of the outer and center legs extend into openings in the tape-engaging-face of a magnetic shield housing for the transducer. The two openings are quite close together because of the close track spacing. To further reduce interference between channels, the two openings are made as narrow as possible while still accommodating the core tips. The magnetic shield housing thus tends to short out any signals that would otherwise affect an adjacent channel.

This unique combination of elements provides a compact, highly efficient stereo tape head especially useful for use with eight track stereo tapes to record, erase and play back. The same concepts are of course useable on either monaural or multiple track heads of any track width or spacing. The unit is sufficiently low in cost so that its use is feasible with stereo units for the home and automobile.

DESCRIPTION OF THE PREFERRED EMBODIMENT

Figures 1, 2, 3, 4:
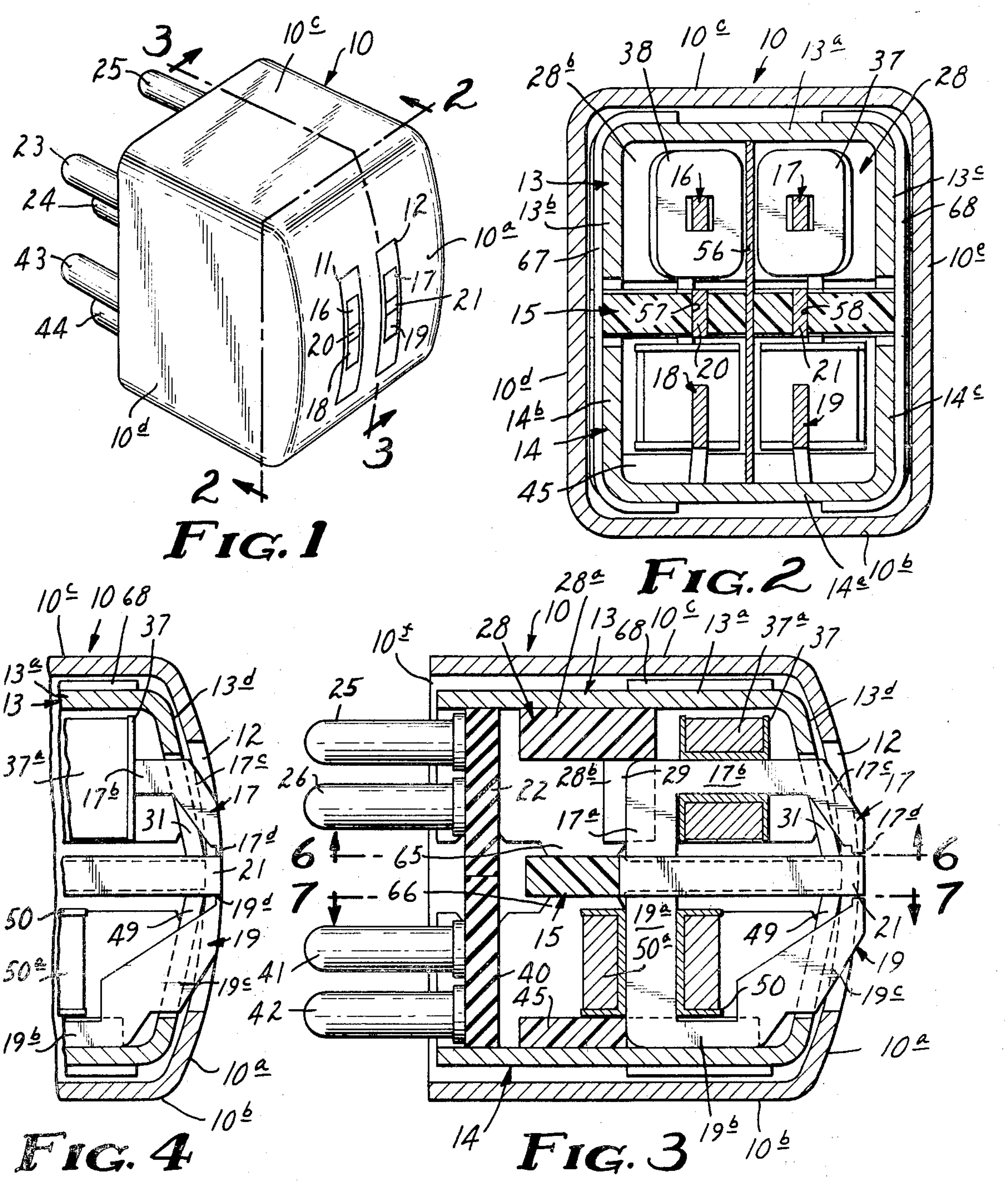
FIG. 1 is a perspective view, greatly enlarged, showing a magnetic transducer constructed according to my invention.
FIG. 2 is an enlarged sectional view taken along line 2—2 of FIG. 1.
FIG. 3 is an enlarged sectional view taken along line 3—3 of FIG. 1.
FIG. 4 is a sectional view, similar to FIG. 3, some parts removed.

In the drawings, like numerals will be used throughout the several views to indicate like elements of the invention. The drawings disclose a magnetic transducer having a box-like magnetic shield housing 10 having a curved tape engaging face 10*a*, a pair of end walls 10*b* and 10*c*, a pair of side walls 10*d* and 10*e*, and an open bottom 10*f* disposed opposite the tape engaging face 10*a*. Formed in tape engaging face 10*a* are a pair of narrow, generally rectangular, parallel openings 11 and 12 that are spaced apart a distance corresponding to the distance between the two tracks on the magnetic tape that are being used.

The present binaural head structure is designed for alternatively erasing and recording or playing back signals on a multitrack magnetic tape. Thus, two complete sets of magnetic core units are provided, each set being capable of performing the erase, recording and playback functions for one channel. Each magnetic core unit of the dual head is of the three-leg type, with the record/play and erase sections sharing a common center leg. Referring again to the drawings, the electromagnetic elements are mounted in three separate core holders designated 13, 14 and 15. Core holder 13 carries a pair of generally U-shaped core pieces 16 and 17 that form a major part of the erase circuit for each channel. Core holder 14 carries a pair of generally U-shaped core pieces 18 and 19 that form a major part of the record/playback circuit for each channel. Core holder 15 carries two center leg core pieces 20 and 21. Each center leg core piece 20 and 21 provides a path through at least a portion thereof for high frequency flux for the erase gap, plus bias and audio flux for the R/P gap.

Core holder 13, which carries the major elements of the erase circuit, includes a flat back wall portion 13*a*, a pair of opposite flat side wall portions 13*b* and 13*c*, and a flat top wall portion 13*d* that extends upwardly and outwardly at a slight angle with respect to back wall portion 13*a*. The bottom of core holder 13 opposite top wall portion 13*d* is open and the front of core holder 13 opposite back wall portion 13*a* is also open. Side wall portions 13*b* and 13*c* are provided with a pair of slots adjacent the open bottom of core holder 13 in which is mounted a base member 22 made from an electrically insulating material. A plurality of electrical contact pins 23, 24, 25 and 26 are mounted on base member 22 and extend downwardly from it and at right angles to it. Base member 22 itself is mounted perpendicular to both back wall portion 13*a* and side wall portions 13*b* and 13*c*.

Extending between side wall portions 13*b* and 13*c*, midway between base member 22 and top wall portion 13*d* is an L-shaped support member 28 having a pair of legs 28*a* and 28*b*. One leg 28*a* of support member 28 is adhesively secured to the inside of back wall portion 13*a*. The other leg 28*b* extends outwardly from back wall portion 13*a* in parallel with base member 22. Leg 28*b* extends outwardly from back wall portion 13*a* a distance slightly less than the corresponding side wall portions 13*b* and 13*c*. A pair of slots 29 and 30 are formed at spaced apart points in leg 28*b* and extend rearwardly from the front edge thereof. A pair of corresponding slots 31 and 32 are formed in top wall portion 13*d* to extend rearwardly from the front edge thereof.

Figures 5, 6, 7, 8:
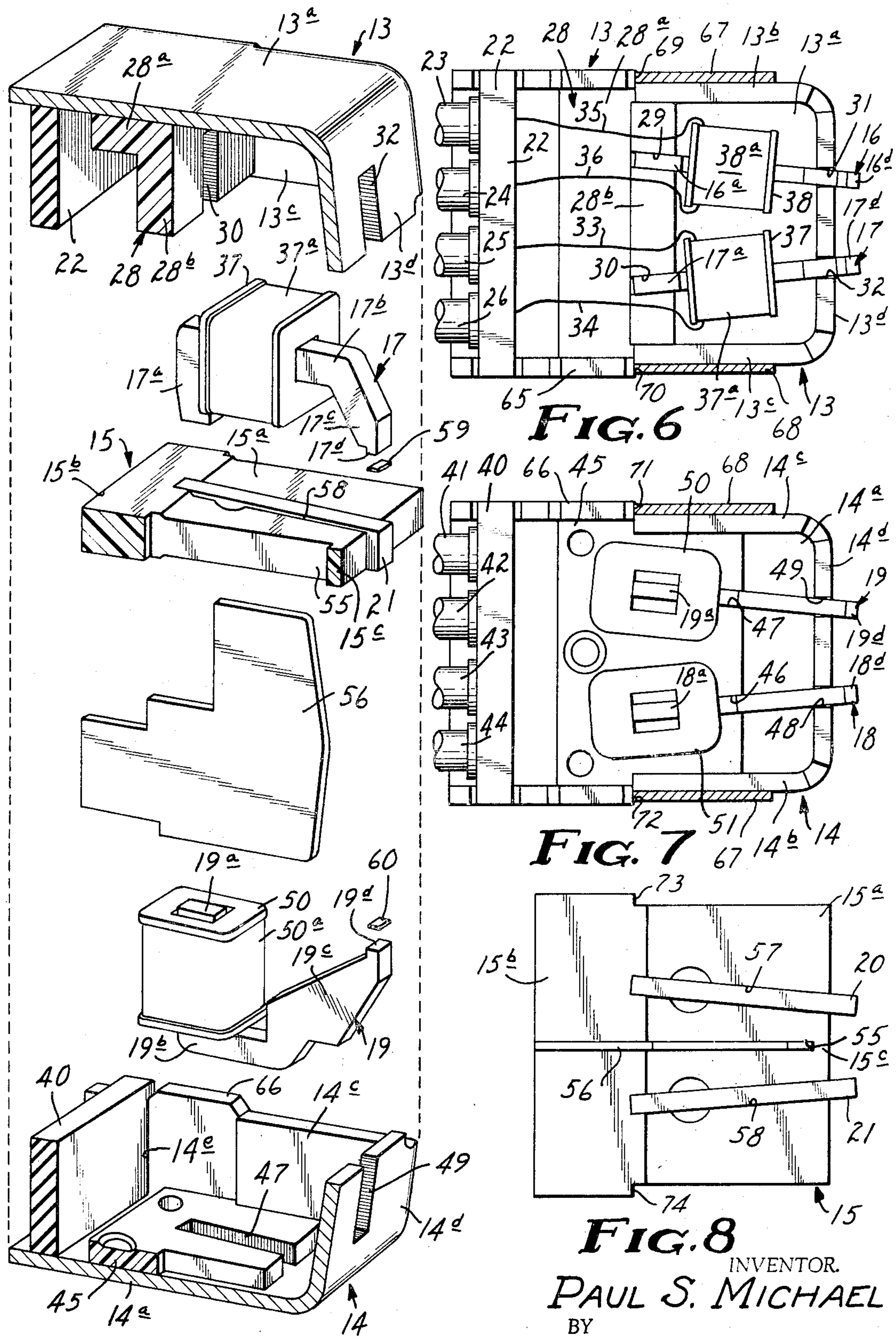
FIG. 5 is an exploded perspective view of one side of the magnetic transducer.
FIG. 6 is a sectional view taken along line 6—6 of FIG. 3, some parts removed.
FIG. 7 is a sectional view taken along line 7—7 of FIG. 3, some parts removed.
FIG. 8 is a plan view of the center core holder of the magnetic transducer.

Each of the U-shaped core pieces 16 and 17 that are mounted in core holder 13 comprise a base leg portion designated with the letter *a*, a side leg portion designated with the letter *b* and a top leg portion designated by the letter *c* terminating in a core tip designated by the letter *d*. The free ends of the base leg portion *a* and the core tip *d* lie in the same plane. Since core pieces 16 and 17 are mounted in core holder 13 in the same manner, a description of the method of mounting one will suffice. Referring to FIGS. 5 and 6, for example, U-shaped core piece 17 is mounted in core holder 13 with the ends of the base and top leg portions extending toward the open side of the core holder. Base leg portion 17*a* is mounted in slot 30 while top leg portion 17*c* is mounted in slot 32. Core piece 17 is adhesively secured in these slots so that its position with respect to core holder 13 is fixed. As shown on the various figures of the drawings, the major part of top leg portion 17*c* extends through slot 32 beyond the upper surface of top wall portion 13*d*.

Mounted on side leg portion 17*c* is a bobbin 37 carrying a coil of wire 37*a*. Mounted on side leg portion 16*b* is a similar bobbin 38 carrying a similar coil of wire 38*a*. Both of the U-shaped core pieces in the erase section thus carry a coil mounted on the side leg thereof.

As best shown in FIG. 6, slots 29 and 30 in base member 28 are spaced apart a greater distance than are slots 31 and 32 in top wall portion 13*d*. Therefore, core pieces 16 and 17, when mounted in their respective slots, converge closer together adjacent their core tips than at their base leg portions. Thus, closer track spacing is achieved at the tape head face while permitting sufficient room for bobbins 37 and 38 to be mounted on the side leg portions.

Also shown in FIG. 6 are the wires connecting the coils to the pins. A pair of wires 33 and 34 connect the coil in bobbin 37 to pins 25 and 26. A pair of wires 35 and 36 connect the coil in bobbin 38 to pins 23 and 24.

Core holder 14, which carries the major elements of the record/playback circuit, includes a flat back wall portion 14*a*, a pair of opposite side wall portions 14*b* and 14*c*, and a flat top wall portion 14*d* that extends upwardly and outwardly at a slight angle with respect to back wall portion 14*a*. The bottom of core holder 14 opposite top wall portion 14*d* is open and the front of core holder 14 opposite back wall portion 14*a* is also open. Side wall portions 14*b* and 14*c* are provided with a pair of slots adjacent the open bottom of core holder 14 in which is mounted a base member 40 made from an electrically insulating material. Referring to FIG. 5, the slot in side wall portion 14*c* is shown and is designated as slot 14*e*. Base member 40 is thus mounted in slot 14*e* and in a corresponding slot in side wall portion 14*b*, perpendicular to both back wall portion 14*a* and side wall portions 14*b* and 14*c*. A plurality of electrical contact pins 41, 42, 43 and 44 are mounted on base member 40 and extend downwardly from it and at right angles to it.

Extending between side wall portions 14*b* and 14*c*, between base member 40 and top wall portion 14*d*, is a flat support member 45. The rear side of flat support member 45 is adhesively secured to the inside of back wall portion 14*a*. A pair of slots 46 and 47 are formed at spaced apart points in support member 45 and extend downwardly from the top edge thereof. A pair of corresponding slots 48 and 49 are formed in top wall portion 14*d* to extend rearwardly from the front edge thereof.

Each of the generally U-shaped core pieces 18 and 19 that are mounted in core holder 14 comprise a base leg portion designated with the letter *a*, a side leg portion designated with the letter *b* and a top leg portion designated by the letter *c* terminating in a core tip designated by the letter *d*. The free ends of the base leg portion *a* and the core tip *d* lie in the same plane. Since core pieces 18 and 19 are mounted in core holder 14 in the same manner, a description of the method of mounting one will suffice. Referring to FIGS. 5 and 7, for example, U-shaped core piece 19 is mounted in core holder 14 with the ends of the base and top leg portions extending toward the open side of the core holder. Side leg portion 19*b* is mounted in slot 47 while top leg portion 19*c* is mounted in slot 49. Core piece 19 is adhesively secured in the slots so that its position with respect to core holder 14 is fixed. As shown on the various figures on the drawings, a part of top leg portion 19*c* extends through slot 49 beyond the upper surface of top wall portion 14*d*.

Mounted on base leg portion 19*a* is a bobbin 50 carrying a coil of wire 50*a*. Mounted on base leg portion 18*a* is a similar bobbin 51 carrying a similar coil of wire 51*a*. Both of the generally U-shaped core pieces in the record/playback section thus carry a coil horizontally mounted on a base leg thereof.

As best shown in FIG. 7, the slots 46 and 47 in support member 45 are formed at an angle with respect to their corresponding side wall portions 14*b* and 14*c*. Slots 46 and 47 are also spaced apart a greater distance than the slots 48 and 49 in top wall portion 14*d*. Thus, as previously described for core pieces 16 and 17 in the erase section, core pieces 18 and 19 have their top leg portions more closely spaced than their base leg portions. Additional room is thus provided for the coils that are mounted thereon. A pair of wires (not shown) extending from coil 50*a* are connected to pins 41 and 42 respectively. Another pair of wires (not shown) extending from coil 51*a* are connected to pins 43 and 44.

Center leg core holder 15 is constructed from an electrical insulating material such as plastic, and has a generally flat, rectangular shape. As best shown in FIGS. 2 and 3, center leg core holder 15 is designed to be positioned between the oppositely disposed core holders 13 and 14. Core holder 15 has an upper rectangular portion 15*a* of generally uniform thickness, and a lower rectangular portion 15*b*, also of generally uniform thickness. Portion 15*b* is slightly thicker than portion 15*a*, however. Portion 15*b* forms the bottom section of core holder 15 while portion 15*a* forms the top section thereof. A vertical slot 55 is formed along the center line of core holder 5 extending from near its top edge downwardly through portion 15*a* into bottom portion 15*b*. Since slot 55 does not extend all the way to the top edge of core holder 15, a bridge 15*c* remains between portions 15*a* along the top edges thereof to prevent the sides of core holder 15 from moving out of a coplanar relationship. Slot 55 is designed to accommodate a mu-metal shield 56 that extends transversely between the two magnetic core units of the transducer.

Formed in core holder 15 on opposite sides of slot 55 are a pair of slots 57 and 58. Slots 57 and 58 also extend from the top edge of portion 15*a* downwardly into portion 15*b*. Slots 57 and 58 are positioned farther apart at their bottom ends than at their top ends so that they converge together to some extent near the top edge of core holder 15. Center leg core piece 20 is adhesively secured in slot 57 while center leg core piece 21 is adhesively secured in slot 58. The top ends of core pieces 20 and 21 extend upwardly beyond the top edge of core holder 15, as best shown in FIG. 8. It is noted that core pieces 20 and 21 have the same thickness as base portion 15*b* so that their surfaces are coplanar with the opposite surfaces of portion 15*b*.

Core holders 13 and 14 are mounted in housing 10 with their open sides facing each other and with their core pieces being arranged in oppositely disposed pairs. Thus, as best shown in FIG. 2, core pieces 16 and 18 form one oppositely disposed pair while core pieces 17 and 19 form another oppositely disposed pair. The core tips of core pieces 16 and 18 extend upwardly into slot or opening 11 in the tape engaging face 10*a*. The core tips of core pieces 17 and 19 likewise extend upwardly into slot or opening 12. Core pieces 16 and 18 are arranged in a coplanar relationship as are core pieces 17 and 19.

Center leg core holder 15 is mounted between core holders 13 and 14 in housing 10, to position center leg core pieces 20 and 21 between their corresponding pair of U-shaped core pieces. Thus, core piece 20 forms the center leg for the oppositely disposed core pieces 16 and 18, while center leg core piece 21 forms the center leg between U-shaped core pieces 17 and 19. The ends of the base leg portions of the U-shaped core pieces abut tightly against their corresponding center leg core piece while the core tips at the upper end are slightly spaced from their associated center leg core piece to provide erase and R/P gaps. One erase gap is formed between core tip 16*d* and the top end of center leg core piece 20. The erase gap for the other channel is formed between core tip 17*d* and the top end of center leg core piece 21. One R/P gap is formed between core tip 18*d* and the top end of center leg core piece 20. The R/P gap for the other channel is formed between core tip 19*d* and the top end of center leg core piece 21. These gaps are shown on the drawings in greatly enlarged form. In actual practice, the erase gap is approximately .003 inch long, and the R/P gap is approximately .0001 inch long. To provide each erase gap, a strip 59 of Mylar plastic of appropriate thickness is mounted between each core tip 16*d* and 17*d* and the associated center leg core pieces. A gap spacer 60 of appropriate thickness, made from a hard metal foil, is mounted between each core tip 18*d* and 19*d* and the associated center leg core pieces to form the R/P gaps. The R/P gap spacers may also be deposited as by sputtering or the like if so desired.

It is extremely important that correct alignment of the core pieces be achieved when the three core holders are inserted in housing 10. The first step in obtaining this correct alignment is to make sure that each of the core holders will position its associated set of core pieces in the correct position. This is achieved by first accurately positioning the slots in the core holders, and then by adhesively securing the individual core pieces in the mounting slots while holding them in position with a suitable jig or fixture. After the electromagnetic elements have been securely and accurately mounted in their respective core holders, the next step is a grinding and lapping operation to make the adjoining faces of the core holders coplanar. Thus, each of the side wall portions 13*b*, 13*c*, 14*b* and 14*c* is provided with a raised edge portion or lapping pad adjacent base member 22 or 40. The raised edge portion for side wall portion 13*c* is designated by the numeral 65 while the raised edge portion for side wall portion 14*c* is designated by the numeral 66. The functions of the raised edge portions will be discussed with respect to core holder 14 and the same description will apply to core holder 13. As best shown in FIGS. 3 and 5, the surface of raised edge portion 66 lies in the same plane as the edge of top wall portion 14*d*. A raised edge portion on side wall portion 114*b* would also lie in the same plane. When U-shaped core piece 19 is mounted in core holder 14, the end of base leg portion 19*a* and core tip 19*d* also lie in this same plane. Since some inaccuracies will result during assembly, however, all of the surfaces are ground and lapped a slight amount to place them all in the same plane. The same grinding operation is applied to core holder 13 and its associated core pieces. The two opposite sides of center leg core holder 15 are also ground down until the two opposing sides of base portion 15*b* and the two opposing sides of the center leg core pieces 20 and 21 lie in parallel planes. When the three core holders are assembled into the housing as shown in FIG. 2, the raised edge portions such as 65 and 66 abut the opposite sides of base portion 15*b*. At the same time, the ends of the opposing base leg portions of the core pieces abut the bottom end of the associated center leg core piece. Also, the core tips abut the top ends of the associated center leg core pieces, except as spaced by the gap spacers previously described.

After this grinding operation has taken place and the three core holders are assembled as shown in FIG. 2, core pieces 16, 18 and 20 will lie in the same plane and will closely abut each other to provide the desired flux paths. In like manner, core pieces 17, 19 and 21 will all lie in a single plane. As previously noted, mu-metal shield 56 is inserted in slot 55 and extends between the two previously mentioned planes of the magnetic core units. The two three-leg magnetic core units are so closely spaced that the lines of force generated by one unit would adversely affects the other unit without the presence of shield 56. Shield 56 thus shorts out the lines of force to prevent interference between channels. The particular configuration of shield 56 as shown in FIG. 5 is not critical to my invention. It is simply necessary that the shield 56 be sufficiently large to block out interference between the adjoining channels.

Before the three core holders are inserted into housing 10, some means must be provided to position and hold them together and prevent shifting between them. The means employed in the present invention are a pair of spring clips designated by the numerals 67 and 68 in FIG. 2. It is noted at this point that the side wall portions 13*b*, 13*c*, 14*b* and 14*c*, while being generally flat, each comprise two sections that are slightly offset from each other, as best shown in FIGS. 6 and 7. The upper sections of the side walls on each core holder are spaced closer together than the bottom sections to provide a pair of shoulders 69 and 70 on core holder 13 and a similar pair of shoulders 71 and 72 on core holder 14. A similar pair of shoulders 73 and 74 are provided on center leg core holder 15. The inner face of spring clip 67 thus lies against the upper section of side wall portion 13*b*, upper portion 15*a* and side wall portion 14*b*. The bottom edge of spring clip 67 abuts against shoulder 69, shoulder 72 and shoulder 73. Spring clip 68 abuts in the same manner against the opposite sides of the core holders. Spring clips 67 and 68 thus prevent shifting of the core holders. Although spring clips are used in the preferred embodiment shown here to position and hold the core holders together, other means such as screws could be used without departing from the present invention. Full details of the structure and use of spring clips of this type are given in the copending Leonard E. Kronfeld application, Ser. No. 580,-981 and now U.S. Pat. No. 3,484,562, that was filed Sept. 21, 1966.

After the three core holders have been assembled together by means of spring clips 67 and 68, they are inserted into housing 10 so that the core tips and the top portions of the center leg core pieces 20 and extend through the openings 11 and 12 as shown in FIG. 3. The unit is then potted by filling the interior cavity and all openings between the various elements with a thermosetting plastic. After the plastic has hardened to secure all of the elements tightly together, the protruding core tips are ground off in line with the curve of the tape engaging face as shown in FIG. 4. At this point, the magnetic transducer is completely fabricated and ready for use.

The present invention is particularly adapted for use with eight track stereo systems. Both the tracks and the guard bands between tracks on such tapes are very narrow so that particular care must be taken to avoid affecting adjacent tracks, both on playback and during recording. In the present invention, the magnetic core units are mounted at an angle with respect to the center line of the transducer so that the magnetic core units are closer together at the tape engaging face than at their bottom ends. This method of mounting the magnetic core units in the housing not only decreases the track spacing but also provides more room for mounting the coils on the magnetic core units. Since the two magnetic core units are mounted so close together, however, it is necessary to place a mu-metal shield 56 between the two units to prevent interference between them. Although the shield 56 acts to reduce or eliminate interference between channels, it tends to cause additional coupling problems between coils on the same magnetic core unit. For example, shield 56 provides an easy path for lines of force traveling between coils 38*a* and 51*a*, both being a part of the same magnetic core unit. To reduce this coupling between coils on the same magnetic core unit, the coils have been placed on mutually perpendicular axes. Lines of force emanating from one coil, such as 38*a* do not then intersect the opposite coil such as 51*a* so as to interfere with the other coil. If the two coils were on the same or parallel axes, the mutual coupling between them would cause biasing of the record track to occur before the erase field would reach sufficient intensity. Also, moving the erase coil to the vetrical side leg portion places it much closer to the erase gap and thus increases the flux density at the erase gap. This more intense flux field at the erase gap insures complete erasure of the tape during recording.

In the present invention, the high frequency bias provided by the vertically positioned erase coils not only provides the necessary erase flux but also provides bias flux for the recording gap. With respect to erase coil 38*a*, for example, the erase flux travels through core piece 16 and core piece 20 while the recording bias travels through core pieces 16, 18 and 20. Therefore, in the present invention, it is not necessary to introduce bias into the R/PB coil directly with the audio signal. The audio record signals and plaback signals utilize the coil on the R/PB leg 18 and the magnetic path formed by core pieces 18 and 20.

Another feature of the present invention is the very narrow openings 11 and 12 in the tape engaging face 10*a*. These openings 11 and 12 are only as wide as necessary to accommodate the core tips and the top ends of the center leg core pieces. This feature tends to reduce cross talk between channels because the magnetic housing 10 shorts out stray hum signals and signals from adjacent tracks.

The tape head of the present invention is also much easier to align with respect to the magnetic tape than previous heads because the erase and R/P gaps of each channel are so close together, i.e. less than .050 inch. Rotation of the tape head with respect to the tape to place the R/P gaps perpendicular to the tape edge causes only slight vertical movements of the corresponding erase gaps. Because of these many features and advantages, the tape head of the present invention can be utilized to either record and erase, or playback signals from an eight track tape. Prior to the present invention, it was not commercially feasible to provide all of these functions in a single head for use with eight track tape. Therefore, such tapes were prerecorded and were designed for playback use only in commercially available systems. The present invention provides a high quality transducer that will provide all of these functions at a reasonable price.

While I have shown and described a specific embodiment of this invention, further modification and improvements will occur to those skilled in the art. I desire it to be understood, therefore, that this invention is not limited to the particular form shown and I intend in the appended claims to cover all modifications within the spirit and scope of this invention.

What is claimed is:

1. A multitrack magnetic transducer for alternatively erasing and recording or playing back signals on a multitrack magnetic tape, comprising:

(a) a magnetic shield housing having a tape engaging face with at least a pair of narrow, generally rectangular, parallel openings therein;

(b) first and second core holders each having an open side defined by a generally planar side edge;

(c) a plurality of generally U-shaped separate and unconnected core pieces fixedly mounted in each of said core holders, each of said core pieces having a base leg portion, a side leg portion and a top leg portion terminating in a core tip, said base and top leg portions extending toward said open side of said associated core holder and terminating in a coplanar relationship with said side edge;

(d) said core holders being mounted in said housing with said open sides facing each other and with said core pieces being arranged in oppositely disposed pairs, each pair having its respective core tip extending into a corresponding housing opening;

(e) a generally flat center leg core holder mounted between said opposing side edges of said core holders, said center leg core holder having a plurality of slots therein equal in number to said pairs of core pieces, each slot extending from adjacent said base leg portions to adjacent said top leg portions;

(f) a separate and unconnected center leg core piece mounted in each of said slots with a top portion thereof extending into said associated housing opening between a pair of core tips to provide a common flux path for erase, recording or playback signals;

(g) an erase coil mounted on a side leg portion of each core piece in said first core holder;

(h) a recording/playback coil mounted on a base leg portion of each core piece in said second core holder, said erase coil and said recording/playback coil of each pair thereby being positioned generally perpendicular to each other to reduce coupling between said coils; and (i) highly permeable metal shield means mounted between adjacent pairs of core pieces and coils to prevent cross talk between adjacent channels.

2. The apparatus of claim 1 wherein gap spacers are mounted between each of said core tips and said corresponding center leg to provide erase and recording gaps for each channel, and wherein the distance between said erase and recording gaps for each channel is less than .050 inch.

3. A multitrack magnetic transducer for alternately erasing and recording or playing back signals on a multitrack magnetic tape, comprising:

(a) a housing having a tape engaging face with at least a pair of spaced apart openings therein;

(b) first and second groups of generally U-shaped separate and unconnected core pieces fixedly mounted in said housing, each of said core pieces having a base leg portion, a side leg portion and a top leg portion terminating in a core tip;

(c) said first and second groups of core pieces being arranged in oppositely disposed pairs, each pair of core pieces being arranged in a coplanar relationship with their core tips extending into a housing opening;

(d) a separate and unconnected center leg core piece mounted between each pair of oppositely disposed core pieces with a top portion thereof extending between said core tips and a bottom portion thereof abuting the ends of said base leg portions;

(e) an erase coil mounted on a side leg portion of each core piece in said first group;

(f) a recording/playback coil mounted on a base leg portion of each core piece in said second group said coils of each group being mounted generally at right angles to each other to reduce coupling between said coils;

(g) a gap spacer mounted between each core tip and said associated center leg core piece; and (h) a highly permeable metal shield mounted between adjacent pairs of core pieces and coils to prevent cross talk between adjacent channels.

4. A dual track magnetic transducer for alternatively erasing and recording or playing back signals on a multitrack magnetic tape, comprising:

(a) a housing;

(b) first and second pairs of generally U-shaped separate and unconnected core pieces fixedly mounted in said housing, each of said core pieces having a base leg portion, a side leg portion and a top leg portion terminating in a core tip;

(c) a separate and unconnected center leg core piece mounted between each pair of core pieces with a top portion thereof extending between said core tips so as to provide erase and recording gaps therebetween, and a bottom portion thereof abuting the ends of said base leg portions;

(d) an erase coil mounted on a side leg portion of a corresponding core piece of each pair to provide erase flux and recording bias;

(e) a recording/playback coil mounted on a base leg portion of the other core piece in each pair said coils of each pair being mounted generally at right angles to each other to reduce coupling between said coils; and (f) highly permeable shield means mounted between said pairs of core pieces and coils.

5. The apparatus of claim 4 wherein gap spacers are mounted between each of said core tips and said corresponding center leg to provide erase and recording gaps for each channel and wherein the distance between said erase and recording gaps for each channel is less than .050 inch.

6. The apparatus of claim 4 wherein the distance between said first and second pairs of core pieces is greater between said base leg portions than between said top leg portions.

7. The apparatus of claim 6 wherein said housing has a tape engaging face with generally rectangular, parallel openings, wherein each pair of core pieces and associated center leg extend into one of said openings, and wherein the width of said openings is no greater than that necessary to accommodate said core pieces.

8. A magnetic transducer for alternatively erasing and recording or playing back signals on a multitrack magnetic tape, comprising:

(a) a plurality of generally U-shaped separate and unconnected core pieces, each of said core pieces having a base leg portion, a side leg portion and a top leg portion terminating in a core tip;

(b) means for mounting said core pieces in spaced pairs, the core pieces in each pair being oppositely disposed and generally coplanar;

(c) a separate and unconnected center leg core piece mounted between each pair of core pieces with a top portion thereof extending between said core tips so as to provide erase and recording gaps therebetween, and a bottom portion thereof abuting the ends of said base leg portions;

(d) an erase coil mounted on a side leg portion of a corresponding core piece of each pair to provide a high frequency flux for the erase gap and a bias flux for the recording gap when energized;

(e) a recording/playback coil mounted on a base leg portion of the other core piece in each pair said coils of each pair being mounted generally at right angles to each other to reduce coupling between said coils; and (f) highly permeable shield means mounted between said pairs of core pieces and coils.

9. A magnetic transducer for alternatively erasing and recording or playing back signals on a multitrack magnetic tape, comprising:

(a) a plurality of generally U-shaped separate and unconnected core pieces, each of said core pieces having a base leg portion, a side leg portion and a top leg portion terminating in a core tip;

(b) means for mounting said core pieces in spaced pairs, the core pieces in each pair being oppositely disposed and generally coplanar;

(c) a separate and unconnected center leg core piece mounted between each pair of core pieces with a top portion thereof extending between said core tips so as to provide erase and recording gaps therebetween, and a bottom portion thereof abuting the ends of said base leg portions;

(d) an erase coil mounted on a core piece of each pair to provide a high frequency flux for the erase gap and a bias flux for the recording gap when energized;

(e) a recording/playback coil mounted on the other core piece of each pair, said coils of each pair being mounted generally at right angles to each other to reduce coupling between said coils; and (f) highly permeable shield means mounted between said pairs of core pieces and coils.

References Cited

UNITED STATES PATENTS

| | | | |
|---|---|---|---|
| 3,412,216 | 11/1968 | Rosado et al. ------ | 179—100.2 |
| 3,432,921 | 3/1969 | Page ------------- | 179—100.2 |
| 2,803,708 | 8/1957 | Camras ----------- | 179—100.2 |
| 3,211,843 | 10/1965 | Dundovic et al. ---- | 179—100.2 |

BERNARD KONICK, Primary Examiner

R. S. TUPPER, Assistant Examiner